United States Patent [19]

Kadanka et al.

[11] Patent Number: 6,016,017

[45] Date of Patent: *Jan. 18, 2000

[54] SYSTEM FOR PROVIDING AN UNINTERRUPTED SUPPLY VOLTAGE AND METHOD

[75] Inventors: Petr Kadanka, Roznov pod Radhostem; Antonin Rozsypal, Hutisko - Solanec, both of Czech Rep.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/989,726

[22] Filed: Dec. 12, 1997

[51] Int. Cl.$^7$ ......................................................... H02J 7/00
[52] U.S. Cl. ............................................... 307/64; 307/80
[58] Field of Search .................................... 307/64, 66, 43, 307/80, 51, 125, 126, 65, 85–87; 315/86, 160, 167; 340/333; 361/18, 5–7, 67, 78, 79, 88; 362/20; 363/89; 324/537, 763, 771, 549, 76.11

[56] References Cited

U.S. PATENT DOCUMENTS 4,122,359 10/1978 Breikss .
4,422,163 12/1983 Oldenkamp .
5,375,246 12/1994 Kimura et al. .

OTHER PUBLICATIONS

Wolbert, B.:"Designing with Low–Dropout Voltage Regulators", drawing MIC2950/2951, published by Micrel Semiconductor, 1849 Fortune Drive, San Jose, CA 95131.

*Primary Examiner*—Jeffrey Gaffin
*Assistant Examiner*—Peter Zura
*Attorney, Agent, or Firm*—Robert Atkins; Rennie W. Dover

[57] ABSTRACT

A system (200) comprises a regulator (250), a battery unit (220), a voltage sensitive circuit (210, e.g., memory circuit) and a switchable sensor (280). The battery unit (220), the memory circuit (210) and the switchable sensor (280) are parallel coupled to terminals (266 and 264) of the regulator (250). The switchable sensor (280) itself has a serially coupled voltage sensor (230) and switch (240). In a first operating mode, the regulator (250) provides a voltage $V_2$ to the memory circuit (210) and to the switchable sensor (280). The switch (240) is closed. The voltage sensor (230) measures the voltage $V_2$ and communicates the result to the regulator (250) via a signal input (267). In a second operating mode, the regulator (250) does not provide the voltage $V_2$. The switch (240) is open. The battery unit (220) provides a voltage $V_4$ to the memory circuit (210), but not to the voltage sensor (230). Parasitic current backflow from the battery unit (220) to the voltage sensor (230) is thereby substantially avoided.

8 Claims, 2 Drawing Sheets

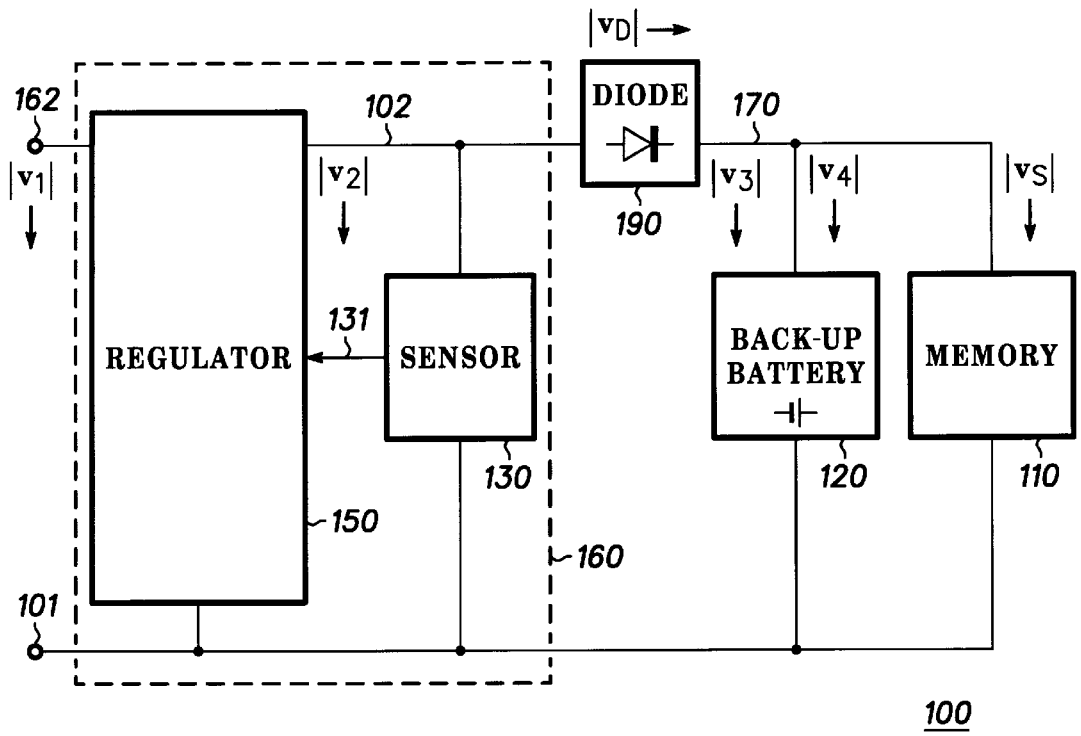
*- PRIOR ART -* FIG. 1
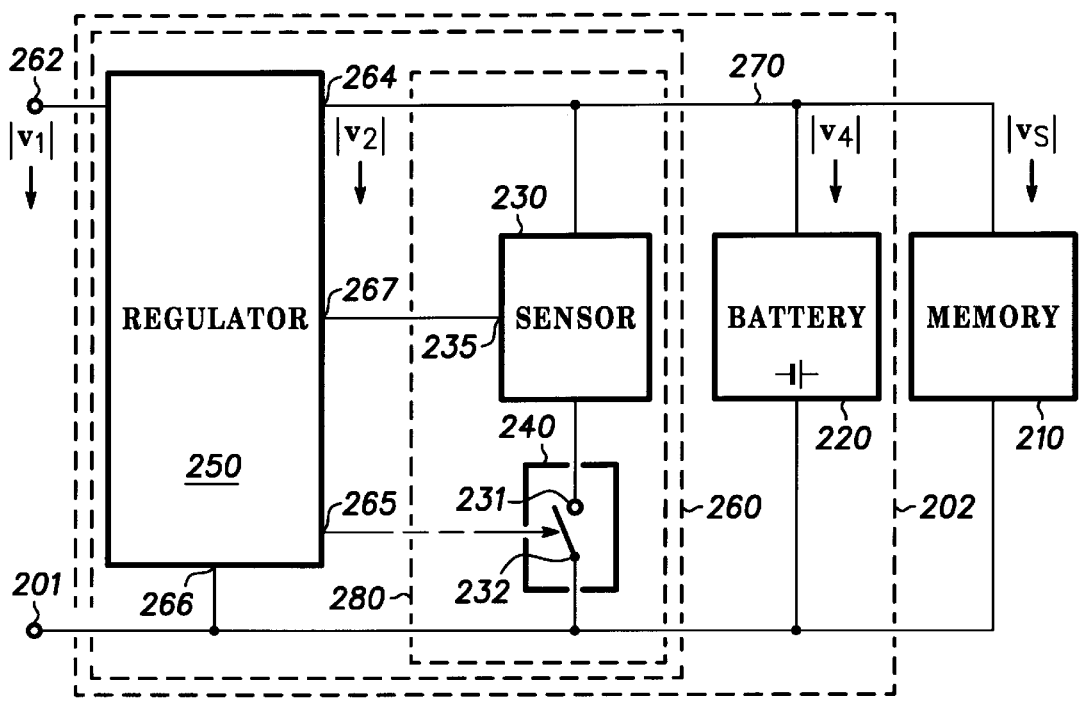
FIG. 2

SYSTEM FOR PROVIDING AN UNINTERRUPTED SUPPLY VOLTAGE AND METHOD

FIELD OF THE INVENTION

The present invention generally relates to electronic circuits, and, more particularly to power supply circuits and to a method.

BACKGROUND OF THE INVENTION

Many systems have sensitive portions such as volatile memories, clocks or the like which continuously need to receive a supply voltage $|v_S|$. During normal operation, all portions including the sensitive portions receive supply voltages (e.g., $|v_S|$) from main batteries (e.g., DC), from the mains (e.g., AC) or from other sources. During stand-by operation, only the sensitive portions receive $|v_S|$ from a back-up battery. At all times, the supply voltage $|v_S|$ at the sensitive portions should have a minimum value $|v_{min}|$, that is:

$$|v_S| \geq |v_{min}| \quad (1)$$

Voltages are given here as absolute values (symbols ||) wherein the polarity (plus or minus) is not important.

For example, systems can go from active operation to stand-by operation by an intentional action of a user (e.g., switching off or replacing the battery), by mistake (operating error), or due to a technical failure. Conveniently, the back-up batteries are often coupled in parallel to outputs of voltage regulators. To save costs, the back-up batteries should be discharged only in the stand-by operation, while parasitic discharging during active operation should be minimized. Modern systems require low supply voltages $|v_S|$, such as, for example, 3.3 volts, 1.8 volts, or with even lower values.

For the application of power supply circuits and for prior art designs, the following references are useful: Wolbert, B.:"Designing with Low-Dropout Voltage Regulators", published by Micrel Semiconductor, 1849 Fortune Drive, San Jose, Calif. 95131 [1]; U.S. Pat. No. 5,375,246 to Kimura [2]; U.S. Pat. No. 4,422,163 to Oldenkamp [3]; and U.S. Pat. No. 4,122,359 to Breikss [4].

FIG. 1 is a simplified block diagram of prior art supply system 100. System 100 comprises memory circuit 110, back-up battery 120, voltage sensor 130, regulator 150, and diode 190. Regulator 150 and voltage sensor 130 form supply circuit 160 (dashed frame). Regulator 150 receives a voltage $|v_1|$ between input terminal 162 and reference line 101. Voltages having an integer subscript (e.g., $|v_1|$) are referred to reference line 101. Regulator 150 provides a voltage $|v_2|$ on line 102. Preferably, the magnitudes of $|v_1|$ and $|v_2|$ are related as:

$$|v_1| > |v_2| \quad (2)$$

Voltage sensor 130 is coupled between lines 102 and 101 and receives voltage $|v_2|$. Voltage sensor 130 feeds back a measurement signal 132 on line 131 to regulator 150. Voltage sensors are well known in the art. For example, voltage sensor 130 can be implemented by two serially coupled resistors in a voltage divider arrangement.

Diode 190 is coupled to line 102 and to line 170. Back-up battery 120 and memory circuit 110 are parallel coupled between lines 170 and 101. When system 100 is active, regulator 150 receives voltage $|v_1|$ and provides voltage $|v_2|$. Voltage $|v_2|$ is preferably constant and smaller than voltage $|v_1|$. Diode 190 propagates $|v_2|$ to $|v_3|$. Voltage $|v_3|$ is the supply voltage $|v_S|$ for memory circuit 110. Optionally, voltage $|v_3|$ can charge back-up battery 120.

When system 100 operates in the stand-by mode, regulator 150 does not provide $|v_2|$. Regulator 150 can optionally receive voltage $|v_1|$, but this is not important. Back-up battery 120 provides voltage $|v_4|$ which becomes the supply voltage $|v_S|$ for memory circuit 110. Now, back-up battery 120 is discharging. Voltage $|v_4|$ of back-up battery 120 can be equal to, higher or lower than voltage $|v_3|$. In any case, during active operation and during stand-by operation, diode 190 prevents the backflow of a parasitic current generated by back-up battery 120 through voltage sensor 130. In other words, a uni-directional current path goes from regulator 150 to memory circuit 110.

However, diode 190 causes a voltage drop $|v_D|$ between voltages $|v_2|$ and $|v_3|$:

$$|v_D| = |v_2| - |v_3| \quad (3)$$

Such voltage drop $|v_D|$ of about 0.3 to 0.6 volts is often not wanted. Voltage $|v_2|$ is larger than supply voltage $v_S$. This is especially inconvenient in a low supply voltage environment.

The present invention seeks to provide supply systems which mitigate or avoid these and other disadvantages and limitations of the prior art.

BRIEF DESCRIPTION OF THE DRAWINGS

FIG. 1 is a simplified block diagram of a prior art supply system;

FIG. 2 is a simplified block diagram of a supply system according to the present invention.

DETAILED DESCRIPTION OF A PREFERRED EMBODIMENT

Figure 3:
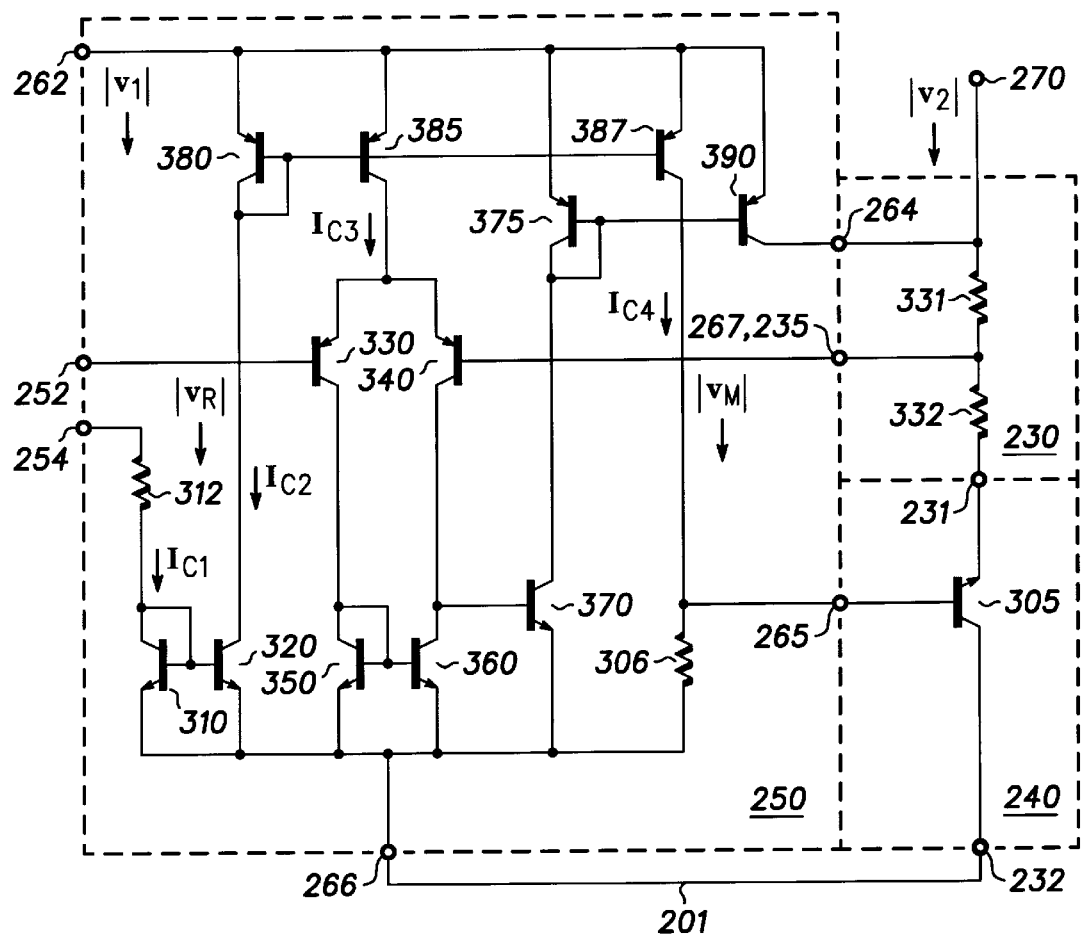
FIG. 3 is a simplified circuit diagram of a supply portion of the system of FIG. 2 in a preferred embodiment of the present invention.

FIG. 2 is a simplified block diagram of a supply system according to the present invention. Supply system 200 (hereinafter system 200) comprises memory circuit 210, battery unit 220, voltage sensor 230, switch 240, and regulator 250. The term "memory circuit" is representative for any circuit which requires an uninterrupted supply of power. Regulator 250, switch 240 and voltage sensor 230 form supply circuit 260 (dashed frame). Supply circuit 260 and battery unit 220 form power supply 202 (dashed frame). Further, implementation details for supply circuit 260 are explained in connection with the example of FIG. 3.

In system 200, voltages $|V_1|$, $|V_2|$, $|V_4|$ and $|V_S|$ are conveniently referred to reference line 201. Voltage $|V_S|$ should have at least a minimum value $|V_{min}|$. Regulator 250 has input terminal 262 for receiving voltage $|V_1|$ and ground terminal 266 coupled to reference line 201. Regulator 250 has output terminal 264 for providing voltage $V_2$ to node 270. Voltage sensor 230 and switch 240 form switchable sensor 280 (dashed frame). Preferably, voltage sensor 230 and switch 240 are serially coupled between node 270 and line 201. In the example of FIG. 2, voltage sensor 230 is near node 270 and switch 240 is near line 201. Switch 240 and voltage sensor 230 can be arranged in either serial order. The serial connection is convenient for explanation, but not essential for the present invention. For example, switch 240 can also be coupled between output terminal 264 of regulator 250 and node 270. Switch 240 illustrates that voltage sensor 230 can temporarily be substantially disconnected from system 200. Switch 240 has, preferably, terminal 231 coupled to mode 270 via sensor 230 and terminal 232 coupled to line 201. For simplicity of explanation, switch 240 is either in a closed position (terminals 231 and 232 connected together) or in a substantially open position (terminals 231, 232 not connected together).

Voltage sensor 230 has signal output 235 coupled to signal input 267 of regulator 250 to send a measurement signal. Optionally, regulator 250 has control output 265 for sending a control signal to switch 240 (dashed arrow). Preferably, battery unit 220 and memory unit 210 are parallel coupled between node 270 and line 201. Preferably, battery unit 220 is removably coupled to node 270.

In a first operating mode of system 200 (active), regulator 250 receives voltage $|V_1|$ at terminal 262 and provides voltage $|V_2|$ to node 270. Voltage $|V_2|$ is substantially the supply voltage $|V_S|$ of memory circuit 210:

$$|V_S| \approx |V_2| \qquad (4)$$

In comparison to the prior art, there is no substantial voltage drop. This is a significant advantage of the present invention. In the first operating mode, switch 240 is in the closed position and voltage sensor 230 measures voltage $|V_2|$ and send a measurement signal to regulator 250. In the first operating mode, switch 240 can be closed all the time or closed only when regulator 250 requires a measurement signal at input 267. This a further advantage and saves energy.

In a second operating mode of system 200 (stand-by), regulator 250 does not provide voltage $|V_2|$ to node 270. Battery unit 220 provides voltage $|V_4|$ as supply voltage $|V_S|$ to memory unit 210:

$$|V_S| \approx |V_4| \qquad (5)$$

Preferably, switch 240 is in the open position and during the second operating mode voltage sensor 230 does substantially not discharge battery unit 220. It is possible that regulator 250 temporarily closes switch 240 to obtain a measurement signal. In the second operating mode, system 200 is preferably switched off and does not receive voltage $|V_1|$. Current backflow from battery unit 220 to voltage sensor 230 is prevented by disabling voltage sensor 230 and not, as in the prior art, by a diode.

In system 200, the voltages are conveniently related as:

$$|V_1| \geq |V_2| \geq |V_4|. \qquad (6)$$

FIG. 3 is a simplified circuit diagram of supply portion 260 of system 200 (FIG. 2) in a preferred embodiment of the present invention. For convenience, reference numbers 201, 230, 231, 232, 235, 240, 250, 262, 265, 266, 267, 264 and 270 correspond in FIGS. 2–3. As illustrated by dashed frames, supply portion 260 comprises regulator 250, voltage sensor 230 and switch 240. Serially coupled resistors 331 and 332 form a voltage divider in the function of voltage sensor 230. Transistor 305 forms switch 240. Transistors 310, 320, 330, 340, 350, 360, 370, 375, 380, 385, 387, and 390 and resistors 312 and 306 form regulator 250. Conveniently, regulator 250 has reference terminal 252 for receiving reference voltage $|V_R|$ and enable terminal 254 for receiving an ENABLE signal.

The transistors used to implement the present invention are, preferably, bipolar transistors having an emitter (E) and a collector (C) as main electrodes and a base (B) as control electrode. For simplicity, the letters E, C and B can be combined with the reference numbers of the transistors. For example, E-390 stands for an emitter of transistor 390, C-390 for a collector of transistor 390 and so forth.

Transistors can also be field effect transistors (FETs) with sources and drains as main electrodes and gates as control electrodes, or other devices. The present invention is not limited to complementary technology transistors. Transistors 305, 310, 320, 350, 360 and 370 are, preferably, of the npn-type; and transistors 330, 340, 375, 380, 385, 387 and 390 are, preferably, of the pnp-type. The terms "first type" (e.g., for npn or pnp transistors) and "second type" (e.g., for pnp or npn transistors) are intended to distinguish complementary transistors of opposite conductivity. "First type" and "second type" can refer to either npn or pnp transistors, as the case may be.

In the nonlimiting example of FIG. 3, the components of supply portion 260 are preferably coupled as follows: Input terminal 262 receiving voltage $|V_1|$ is coupled to E-390. C-390 forms output terminal 264 of regulator 250. C-390 providing voltage $|V_2|$ is coupled to resistor 331 and to node 270. Resistors 331 and 332 are coupled together in a node which forms input 267 of regulator 250 and output 235 of voltage sensor 230. Resistors 331 and 332 provide the measurement signal as measurement voltage $|V_M|$. Resistor 332 is further coupled to E-305 (i.e., a terminal of switch 240). C-305 (i.e., the other terminal) is coupled to reference line 201.

Transistor pairs 310/320, 350/360, 375/390 and transistor arrangement 380/385/387 form current mirrors. Transistors 330 and 340 form a differential pair. Enable terminal 254 is coupled to C-310 via resistor 312. C-310, B-310 and B-320 are coupled together. E-310 and E-320 are coupled to line 201. C-320 is coupled to C-380. C-380, B-380 and B-385 are coupled together. E-380 and E-385 are coupled to terminal 262. C-385 is coupled to E-330 and E-340. C-330 is coupled to C-350. C-350, B-350 and B-360 are coupled together. C-340 is coupled to C-360. E-350 and E-360 are coupled to line 201. E-375 is coupled to terminal 262. C-375, B-375 and B-390 are coupled together. C-375 is coupled to C-370. B-370 is coupled to C-360. E-370 is coupled to line 201. E-387 is coupled to terminal 262. C-387 is coupled to B-305 (output 265) and to line 201 via resistor 306. B-330 receives voltage $|V_R|$ from reference terminal 252 and B-340 receives measurement voltage $|V_M|$.

Transistor 305 is, preferably, inverse operated with C-305 coupled to line 201. This is different from transistors 310, 320, 350, 360 and 370 which have their emitters (E) coupled to line 201. This inverse operation features allows one neglect the voltage drop across the emitter-collector path of transistor 305 when transistor 305 is conductive. This is convenient, but not essential for the present invention. For example, E-305 can also be coupled to reference line 201 and C-305 can be coupled to resistor 332.

Assume that system 200 operates in the first mode. Supply portion 260 receives an ENABLE signal as a voltage at around $|V_1|$ on terminal 254. Resistor 312 acts as a current source and generates collector current $I_{C1}$ through transistor 310. Transistor 320 mirrors current $I_{C1}$ to collector current $I_{C2}$ through transistor 320. Transistor 385 mirrors $I_{C2}$ to current $I_{C3}$ for differential pair 330/340. Transistor 387 mirrors current $I_{C2}$ to current $I_{C4}$ through resistor 306. Transistors 330 and 340 compare voltages $|V_M|$ and $|V_R|$ and control transistor 390 through transistors 370 and 375. Transistor 390 supplies voltage $|V_2|$. Transistor 305 (switch 240) is conducting. Resistors 331 and 332 receive voltage $|V_2|$ and conduct a measurement current $I_M$ to line 201.

Assume now that system 200 operates in the second mode. Supply portion 260 receives an ENABLE signal at around the level of line 201 at terminal 254. Resistor 312 does not generate current $I_{C1}$, transistors 310, 320, 330, 340, 350, 360, 370, 375 380, 385, 387, 390 are substantially non-conductive. Transistor 305 (switch 240) is also substantially non-conductive so that resistors 331 and 332 (voltage sensor 230) do not carry a measurement current $I_M$, Supply portion 260 does not provide voltage $V_2$. The absence of measurement current $I_M$ in the second mode is an advantage of the present invention. Battery unit 220 is substantially not discharged.

The present invention can also be described as a power supply (e.g., power supply 202) for providing an uninterrupted voltage to a circuit (e.g., memory circuit 210). The power supply comprises: (a) a back-up battery (e.g., battery unit 220) which is coupled to a power input (e.g., node 270) of the circuit; (b) a converter (e.g., regulator 250) which temporarily forwards an external supply voltage (e.g., voltage $V_1$) to the circuit; and (c) a sensor (e.g., switchable sensor 280) for measuring a voltage (e.g., $V_2$) between the power input of the circuit and a reference potential (e.g., at line 201), the sensor being coupled to a control input (e.g., input 267) of the converter, the sensor being temporarily (e.g., during the second mode) switched off from the reference potential. The terms "regulator" and "converter" are used here as synonyms.

In power supply 202, sensor 230 is preferably switched off from the reference potential when regulator 250 does not forward the external supply voltage $|V_1|$ (e.g., in the second mode). Preferably, sensor 230 is disconnected from reference potential $|V_4|$ when regulator 250 does not receive the external supply voltage (e.g., voltage $|V_1|$). In other words, power supply 202 receives the external supply voltage $|V_1|$ temporarily (e.g., first mode). Sensor 230 is conveniently a voltage divider (e.g., with resistors 331 and 332) serially coupled to a transistor switch (e.g., transistor 305). Regulator 250 conveniently has a further transistor (e.g., transistor 390) with main electrodes (e.g., E-390 and C-390) receiving $|V_1|$ and providing $|V_2|$, respectively. Further transistor 390 is controlled by a control electrode (e.g., B-390) coupled to sensor 230 (e.g., via transistors 375, 370, and 340). Preferably, back-up battery 220 is permanently or removably coupled to the power input; but this is not essential.

A method of the present invention provides an uninterrupted voltage $|V_S| \geq V_{min}$ (e.g., to memory circuit 210) by using a measurement device (e.g., sensor 230) and a switch (240). The method has the following steps: (a) receiving a first voltage $|V_1|$ and deriving a second voltage $|V_2| > |V_{min}|$ from $|V_1|$ (e.g., transistor 390), taking $|V_2|$ as $|V_S|$, connecting the measurement device to $|V_2|$ (e.g., by conductive transistor 305) and regulating a difference $|d| = |V_1| - |V_2|$ (e.g., by regulator 250); (b) receiving a third voltage $|V_4| \geq |V_{min}|$ (e.g., from battery unit 220), taking $|V_4|$ as $|V_S|$ and disconnecting the measurement device from $|V_2|$ using e.g., switch 240 (by disabling transistor 305), and (c) repeating steps (a) and (b).

Preferably, regulating is performed by deriving a voltage $|V_M|$ from $|V_2|$ by way of voltage division by the measurement device (e.g., resistors 331 and 332 of sensor 230) and changing the difference $|d|$ (e.g., the emitter-collector voltage of transistor 390. Conveniently, a switch is provided by a transistor (e.g., transistor 305) which connects (becomes conductive) and disconnects (becomes non-conductive).

According to the present invention, parasitic discharging of the backup battery (e.g., battery unit 220) is prevented by disconnecting a voltage sensor (e.g., sensor 230) when a regulator (e.g., regulator 250) does not supply a voltage (e.g., voltage $V_2$). The path between the regulator and a parallel arrangement of a memory circuit (e.g., circuit 210) and the back-up battery (e.g., battery unit 220) is a bi-directional path.

It is an important advantage of the present invention, that voltage drops across diodes can be avoided. This feature makes the present invention suitable for low voltage applications.

While the invention has been described in terms of particular structures, devices and methods, those of skill in the art will understand based on the description herein that it is not limited merely to such examples and that the full scope of the invention is properly determined by the claims that follow.

We claim:

1. A system for providing an uninterrupted supply voltage to a node, said system comprising:

a regulator temporarily receiving a first voltage $|V_1|$ and temporarily providing a second voltage $|V_2|$ to said node;

a battery unit continuously providing a third voltage $|V_4|$ to said node;

a switchable sensor which is temporarily coupled to said node to measure said second voltage $|V_2|$ and to provide a measurement signal to said regulator, where said swichable sensor has a switch controlled by said regulator for disconnecting said sensor from said battery unit when said regulator does not provide said second voltage $|V_2|$ to prevent current backflow from said battery unit to said switchable sensor.

2. The system of claim 1 wherein a current conduction path between said node and said sensor conducts current bi-directionally.

3. The system of claim 1 wherein said regulator disconnects said sensor from said battery when said second voltage $|V_2|$ provided by said regulator and said third voltage $|V_4|$ provided by said battery unit relate to each other as $|V_2| < |V_4|$.

4. A power supply for providing an uninterrupted voltage to a circuit, said power supply comprising:

a back-up battery coupled in a first path between a power input of said circuit and a reference potential;

a converter temporarily forwarding a voltage from an external supply to said circuit to contribute to said uninterrupted voltage between said power input and said reference potential; and a sensor for measuring said uninterrupted voltage between said power input of said circuit and said reference potential, said sensor having a control output coupled to a control input of said converter, said sensor being coupled in a second path between said power input and said reference potential and being temporarily disconnected from said reference potential by a switch serially coupled into said second path.

5. The power supply of claim 4 wherein said sensor is disconnected when said converter does not forward said voltage from said external supply.

6. The power supply of claim 4 wherein said sensor is disconnected from said reference potential when said converter does not receive said external supply voltage.

7. A method for operating a supply system which provides an uninterrupted voltage $|V_S|$ to a memory circuit, wherein said supply system has a measurement device and said uninterrupted voltage $|V_S|$ is equal to or larger than a minimum voltage $|V_{min}|$, said method comprising the steps of:

(a) receiving a first voltage $|V_1|$ from an external source, deriving a second voltage $|V_2|$ from $|V_1|$ wherein said second voltage $|V_2|$ is larger than said minimum voltage $|V_{min\ 1}|$, providing $|V_2|$ in the function of $|V_S|$, connecting said measurement device to $|V_2|$ and regulating a difference $|d|=|V_1|-|V_2|$;

(b) receiving a third voltage $|V_4|>|V_{min}|$ from a battery, providing $|V_4|$ in the function of $|V_S|$ and disconnecting said measurement device from $|V_2|$, and (c) repeating said steps (a) and (b).

8. An arrangement receiving an input voltage and providing an output voltage between an output node and a reference line, wherein a circuit having a back-up battery can be connected between said output node and said reference line, wherein in said arrangement a resistor voltage divider derives a measurement signal from the output voltage to control a voltage drop between said input voltage and said output voltage, characterized in that a disconnector is serially coupled to the resistor voltage divider to temporarily prevent current backflow from said back-up battery to said voltage divider when said input voltage has a predetermined relation to said output voltage.

\* \* \* \* \*